United States Patent
Tuers et al.

(10) Patent No.: US 9,690,515 B2
(45) Date of Patent: Jun. 27, 2017

(54) DELAYED AUTOMATION TO MAXIMIZE THE UTILIZATION OF READ AND WRITE CACHE

(71) Applicant: SanDisk Technologies Inc., Plano, TX (US)

(72) Inventors: Daniel Edward Tuers, Kapaa, HI (US); Gary Lin, San Jose, CA (US); Abhijeet Manohar, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 180 days.

(21) Appl. No.: 14/063,637

(22) Filed: Oct. 25, 2013

(65) Prior Publication Data

US 2015/0120986 A1 Apr. 30, 2015

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ........ G06F 12/0638; G06F 9/52; G06F 13/18; G06F 3/067; G06F 3/0613; G06F 13/1689; G06F 12/0246
See application file for complete search history.

(56) References Cited

U.S. PATENT DOCUMENTS

| | | | |
|---|---|---|---|
| 6,278,633 B1 | 8/2001 | Wong et al. | |
| 6,307,779 B1 * | 10/2001 | Roohparvar | 365/185.11 |
| 8,250,287 B1 | 8/2012 | Mirichigni | |
| 8,510,496 B1 * | 8/2013 | Totolos et al. | 711/5 |
| 2006/0168418 A1 * | 7/2006 | Adusumilli | 711/169 |
| 2006/0224820 A1 | 10/2006 | Cho et al. | |
| 2006/0265533 A1 * | 11/2006 | Hobson | G06F 13/1657 710/120 |
| 2007/0113000 A1 | 5/2007 | Murin et al. | |

(Continued)

FOREIGN PATENT DOCUMENTS

WO WO 2012/081730 A1 6/2012

OTHER PUBLICATIONS

Yu Liu et al., "Commands Scheduling Optimized Flash Controller for High Bandwidth SSD Application", Solid-State and Integrated Circuit Technology (ICSICT), 2012 IEEE International Conference, 4 pgs.

*Primary Examiner* — Ryan Bertram
*Assistant Examiner* — Trang Ta
(74) *Attorney, Agent, or Firm* — Brinks Gilson & Lione

(57) ABSTRACT

A storage module may include a non-volatile memory module and a controller that communicates with the non-volatile memory module using a communications bus. In response to receipt of a host command, the controller may generate one or more sets of context commands for communication of data on the communications bus between the controller and an area of memory. The controller may execute the sets of context commands in a cache sequence. During execution of the context commands in the cache sequence, the controller may determine an opportunity window that occurs after execution of a context command of a prior set and before execution of a context command of a current set, during which the controller may utilize the communications bus.

19 Claims, 7 Drawing Sheets

(56) References Cited

U.S. PATENT DOCUMENTS

| | | |
|---|---|---|
| 2007/0171721 A1 | 7/2007 | Shibata |
| 2008/0052449 A1* | 2/2008 | Kim et al. .................. 711/103 |
| 2008/0175059 A1 | 7/2008 | Kim et al. |
| 2008/0256292 A1* | 10/2008 | Flynn ................ G06F 1/183 |
| | | 711/114 |
| 2010/0122021 A1 | 5/2010 | Lee et al. |
| 2010/0185808 A1* | 7/2010 | Yu .................. G06F 13/1684 |
| | | 711/103 |
| 2011/0055456 A1 | 3/2011 | Yeh |
| 2013/0051154 A1 | 2/2013 | Michael |
| 2013/0185525 A1* | 7/2013 | Lee ............................ 711/151 |

* cited by examiner

DELAYED AUTOMATION TO MAXIMIZE THE UTILIZATION OF READ AND WRITE CACHE

BACKGROUND

Storage modules may manage data storage in response to host commands received from a host. When a host command is received, an external controller of the storage module may generate context commands to communicate data associated with the host commands between the controller and memory. In response to receipt of a context command, the memory may perform an internal memory operation, such as a sense operation for a host read command or a program operation for a host write command. The external controller and the memory may communicate the data and commands on a bus. While the memory is performing the internal memory operations, the bus may be available for use.

SUMMARY

Embodiments of the present invention are defined by the claims, and nothing in this section should be taken as a limitation on those claims. By way of example, the embodiments described in this document and illustrated in the attached drawings generally relate to a storage module and related methods of a controller that executes context commands on a communications bus in accordance with a cache sequence while a memory module performs internal memory operations.

In one example, a storage module may include a non-volatile memory module comprising a plurality of memory areas; and a controller in communication with the non-volatile memory module via a communications bus. The controller may be configured to generate a plurality of sets of context commands associated with a first memory area of the plurality of memory areas. The plurality of sets of context commands may be generated for execution of one or more host commands. The controller may be configured to execute a first context command of a first set of the plurality of sets of context commands on the communications bus. After execution of the first context command of the first set and before execution of a second context command of the first set, the controller may be configured to execute a first context command of a second set of the plurality of sets of context commands on the communications bus. In addition, the controller may be configured to execute the second context command of the first set on the communications bus; and before execution of a second context command of the second set, the controller may be configured to execute on the communications bus at least one of: a first context command of a third set of the plurality of context commands; or a context command associated with a second area of the plurality of memory areas, where the second memory area is different than the first memory area.

In another example, a method of executing a plurality of sets of context commands on a communications bus linking a non-volatile memory module and a controller may include receiving, with the controller, one or more host commands from a host; and in response to receiving the one or more host commands, executing, with the controller, a first context command of a first set of a plurality of sets of context commands on the communications bus, the plurality of context commands being executed for communication of data on the communications bus between the controller and a first memory area of the non-volatile memory module. The method may further include: before executing a second context command of the first set, executing, with the controller, a first context command of a second set of the plurality of sets of context commands on the communications bus. Additionally, the method may include: executing, with the controller, the second context command of the first set after executing the first context command of the second set; and before executing the second context command of the second set, executing on the communications bus, with the controller, at least one of: a first context command of a third set of the plurality of context commands; or a context command associated with a second area of the plurality of memory areas, the second memory area being different than the first memory area.

In another example, a storage module may include a non-volatile memory module comprising a plurality of memory areas; and a controller in communication with the non-volatile memory module via a communications bus. The controller may be configured to: receive one or more host commands from a host; and in response to receipt of the one or more host commands: generate a plurality of sets of context commands associated with a first memory area of the plurality of memory areas, the plurality of sets generated for communication of data associated with the one or more host commands on the communications bus; and execute the plurality of sets of context commands on the communications bus in accordance with a cache sequence. To execute the plurality of sets of context commands in accordance with the cache sequence, the controller may be configured to: execute a first context command of a first set of the plurality of sets of context commands; execute a first context command of a second set of the plurality of sets of context commands before execution of a second context command of the first set; determine an opportunity time period occurring before execution of a second context command of the second set; and during the opportunity time period, execute a context command on the communications bus that is not part of the first set or the second set.

In sum, an external controller of a storage module may improve performance by utilizing a communications bus in between executing context commands in accordance with a cache sequence.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Various modifications to and equivalents of the embodiments described and shown are possible and various generic principles defined herein may be applied to these and other embodiments. Thus, the claimed invention is to be accorded the widest scope consistent with the principles, features, and teachings disclosed herein.

The present description describes a storage module that includes a controller configured to execute context commands or perform other bus operations on a communications bus between the controller and a memory module while the memory module performs internal memory operations. The controller may execute the context commands or perform the other bus operations on the communications bus upon issuing context commands that instruct the memory module to perform the internal memory operations.

Figure 1:
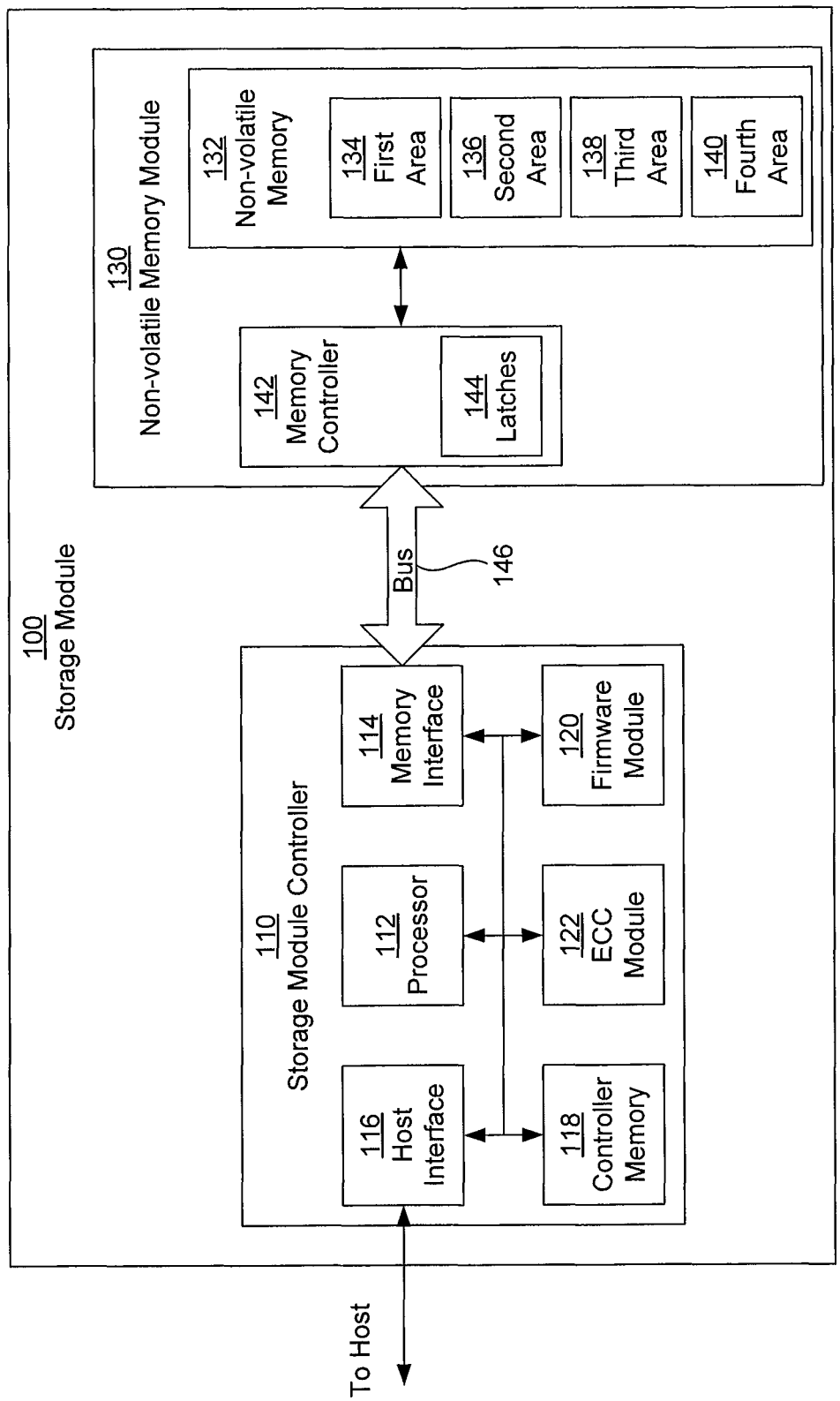
FIG. 1 is a block diagram of an example storage module.

FIG. 1 shows a block diagram of an example embodiment of a storage module 100 that includes a storage module controller 110 and a non-volatile memory module 130. The storage module controller 110 may include a processor 112 that is configured to control and manage storage of data in the storage module 100. The processor 112 may include a single processor or a plurality of processors configured to perform various types of processing, such as co-processing, multi-processing, multi-tasking, parallel processing, remote processing, distributed processing, or the like, to perform the functions and operations of the one or more controllers. Also, the one or more controllers may be configured to execute program instructions that may be part of software, hardware, micro-code, firmware, or the like in order to perform at least some of the function or operations.

In addition, the storage module controller 110 may include a memory interface 114 that interfaces with the non-volatile memory module 130. Also, the storage module controller 110 may include a host interface 116 that configures the storage module 100 operatively in communication with a host (not shown in FIG. 1). As used herein, the phrase "operatively in communication with" could mean directly in communication with or indirectly in communication with through one or more components, which may or may not be shown or described herein. The processor 112, through or using the host interface 116, may receive commands, such as read and write commands, from the host, and also send, through or using the host interface 116, responses to the read and write commands to the host. Additionally, the host interface 116 may take any suitable form, such as, but not limited to, an eMMC host interface, a UFS interface, and a USB interface, as examples.

Also, some configurations of the storage module controller 110 may include controller memory 118, which may be separate or "off-chip" from memory in the non-volatile memory module 130, and which the processor 112 may use or access to perform one or more functions or operations. For example, data may be temporarily stored in the controller memory 118 before being stored in the non-volatile memory module 130 or sent to the host. In addition or alternatively, software and/or firmware including program instructions may be stored in the internal memory 118, which the processor 112 may execute to perform one or more functions. The controller memory 118 may include one or more various types of memory structures or technologies of volatile memory, non-volatile memory, or combinations thereof, including but not limited to random access memory, read-only memory, programmable read-only memory, electrically programmable read-only memory, electrically erasable read-only memory, flash memory (e.g., NAND, NOR, or other flash memories), magnetic tape or disk, optical media, or other memory technologies.

The storage module controller 110 may also include a firmware module 120. The firmware module 120 may include software and/or a set of executable program instructions, which may be stored in the controller memory 118 and/or which the processor 112 may execute or use to perform one or more functions. As used herein, functions or actions performed by the firmware module 120 and functions or actions performed by the processor 112 executing or using the firmware module 120 may be used interchangeably.

In addition, the storage module controller 110 may include an error correction code (ECC) module or engine 122 that may be configured to compensate for bits that may spontaneously fail during normal device operation to ensure data integrity. The ECC module 122 may include or be configured to operate in accordance with one or more algorithms. In addition, the ECC module 122 may be implemented in hardware, software, or a combination thereof. For example, the ECC module 122 may be implemented in hardware logic and/or have its own built-in processor dedicated to performing ECC functions. In addition or alternatively, the ECC module 122 may include software, which may be stored in the controller memory 118 and/or which the processor 122 may execute or use to perform all or some of the ECC functions.

The non-volatile memory module 130 may include non-volatile memory 132 configured to store data or other information in the storage module 100. Example non-volatile memory 132 may include flash memory (e.g., NAND-type flash memory or NOR-type flash memory), read-only memory, ferroelectric RAM (F-RAM), other types of non-volatile memory, either currently existing or later developed, or combinations thereof.

The non-volatile memory 132 may be divided or separated into different areas. The example configuration shown in FIG. 1 includes four memory areas—a first memory area 134, a second memory area 136, a third memory area 138, and a memory fourth area 140, although numbers of memory areas other than four may be used. The different memory areas 134-140 may be divided or separated in different ways. For example, the different memory areas 134-140 may be different memory chips or different memory (e.g., silicon) dies. In addition or alternatively, the different memory area 134-140 may have and/or be identified by different identifiers or chip enables. In addition or alternatively, different or separate commands may be used to perform operations, such as sense or program operations, on the different areas 134-140.

The non-volatile memory module 130 may further include a memory controller 142 configured to control and/or manage the storage of data in the non-volatile memory 132. The memory controller 142 may provide an interface between the storage module controller 110 and the non-volatile memory 132. Additionally, the memory controller 142 may control and/or manage the storage of data in the non-volatile memory 132 in response and/or according to context instructions or commands, such as sense, program, and/or erase commands, received from the storage module controller 110.

The memory controller 142 may be configured to perform various functions to control and/or manage the data storage, including, but not limited to, addressing, data transfer, sensing, row and column decoding, and/or gate biasing. Additionally, the memory controller 142 may be implemented in hardware, including one or more processors, hardware logic, buffers, voltage generators, and/or other circuitry to perform the functions of the memory controller 142.

The memory controller 142 may include latches 144 or other similar storage circuitry configured to store data that is transferred to and from the non-volatile memory 132. For example, data to be programmed into the non-volatile memory 132 in response to a write command from a host may be received from the storage module controller 110 and stored in the latches 144. In addition or alternatively, data sensed from the non-volatile memory 132 in response to a read command from a host may be stored in the latches 144 and then sent to the storage module controller 110. For some example configurations, the latches 144 may be divided into multiple sets. One set may be used for the storage of data communicated between the storage module controller 110 and the non-volatile memory module 130, and another set may be used for the storage of data used by the memory controller 142 when performing internal memory operations.

The storage module 100 may also include a communications bus 146 that provides a communications link between the storage module controller 110 and the non-volatile memory module 130. The bus 146 may be used by the storage module controller 110 and the non-volatile memory module 130 to communicate data, commands, or other information or messages in order to execute host commands received from the host, such as host read and write commands.

When the storage module 100 receives host read and write commands from the host, the storage module controller 110 may be configured to generate, issue and/or execute one or more associated sets of context commands to execute the host read and write commands. In particular, upon receipt of a host read command, the storage module controller 110 may generate at least one set of context commands associated with the host read command, with each set including a pair of a sense command and a data transfer command. The sense command may instruct the storage module 130 to sense data associated with the read command. The storage module controller 110 may issue the sense command on the bus 146, and in response to receipt of the sense command, the memory controller 142 may perform a corresponding sense operation on one of the memory areas 134-140, with the resulting sensed data being stored in the latches 144. The storage module controller 110 may then execute the data transfer command (otherwise referred to as toggling the bus 146), which may cause the sensed data stored in the latches 144 to be transferred on the bus 146 to the storage module controller 110.

In addition, upon receipt of a write command from the host, the storage module controller 110 may generate one or more associated sets of context commands, with each set including a program command, a data transfer command, and a status command. The storage module controller 110 may execute the data transfer command (or toggle the bus 146), which may cause data associated with the write command to be transferred on the bus 146 from the storage module controller 110 to the latches 144. In addition, the storage module controller 110 may issue the program command on the bus 146, which may instruct the storage module 130 to program the data stored in the latches 144 into one of the memory areas 134-140. In response to the receipt of the program command, the memory controller 142 may perform a corresponding program operation on one of the memory areas 134-140. The storage module controller 110 may further issue the status command to determine the status of the program operation from the memory non-volatile storage module 130 and/or whether the program operation is successful.

The configuration of the non-volatile memory module 130 in FIG. 1 shows the memory controller 142 as a single component that communicates with the bus 146 as well as each of the memory areas 134-140. Alternatively, the memory controller 142 may include a plurality of memory controllers, each associated or included with one of the memory areas 134-140. In this way, a context command issued on the bus 146 for a particular memory area 134-140 may be received and/or handled by the memory controller 142 that is associated or included with that particular memory area 134-140.

Additionally, for some example configurations, when the storage module controller 110 is transferring data or issuing context commands to the non-volatile storage module 130 on the bus 146 for one of the memory areas 134-140, the storage module controller 110 may not also simultaneously or concurrently transfer data or issue context commands on the bus 146 for another of the memory areas 134-140. To illustrate, if the storage module controller 110 is toggling data on the bus 146 from the first memory area 134, the storage module controller 110 may not simultaneously or concurrently issue a sense command on the bus 146 for the second memory area 136 to perform a sense operation. Instead, after the storage module controller 110 is finished toggling the data from the first memory area 134, then the storage module controller 110 may issue the sense command on the bus 146 for the corresponding sense operation to be performed on the second memory area 136.

Similarly, the storage module controller 110 may not simultaneously or concurrently use the bus 146 to perform two different operations on the same memory area 134-140. To illustrate, if the storage module controller 110 receives two read commands from the host that requires execution of two pairs of sense and data transfer commands to obtain data from the same memory area 134-140, the storage module controller 110 may not concurrently issue the two sense commands on the bus 146, concurrently execute the two data transfer commands on the bus 146, and/or concurrently issue a sense command for one pair while executing the data transfer command for the other pair. Instead, the storage module controller 110 may execute the different sense and data transfer commands on the bus 146 at different times and/or over different time periods in order to obtain the data from the same memory area 134-140.

The sense and program operations that the non-volatile memory module 130 performs may be considered internal memory operations in that the bus 146 is not used for the performance of these operations. That is, all actions for the performance of the operations, including the transfer of any data or other information, remains internal to the non-volatile memory module 130. Operations performed by the non-volatile memory module 130 other than sense and program operations may also be internal memory operations.

To increase, maximize, and/or optimize bus usage efficiency and overall performance of the storage module 100, the storage module controller 110 may be configured to utilize the bus 146 during the time period that the non-volatile memory module 130 is performing internal memory operations. To do so, the storage module controller 110 may be configured to issue and/or execute context commands for one of the memory areas 134-140—including the sense, program, and data transfer commands—in accordance with a particular execution sequence, referred to herein as a cache sequence. A cache sequence may generally refer to a sequence in which a plurality of context commands are executed for one of the memory areas 134-140 so that the bus 146 may be utilized while the non-volatile memory module 130 is performing one or more internal memory operations for that memory area 134-140. The cache sequence may be different depending on whether the cache sequence is being executed for host read commands or write commands.

In further detail, when the storage module controller 110 receives and/or identifies one or more read commands from the host and, to execute the one or more read commands, determines to generate two pairs of sense and data transfer commands, the storage module controller 110 may be configured to execute the context commands in accordance with a read cache sequence that includes issuing both of the sense commands on the bus 146 before executing either one of the data transfer commands. This read cache sequence may be contrasted from a "normal" read sequence in which the second sense command is not issued on the bus 146 until the storage module controller 110 is finished executing the first data transfer command. Otherwise stated, under the "normal" read sequence, the second pair of sense and data transfer commands is not executed by the storage module controller 110 until the storage module controller 110 is finished executing the first pair of sense and data transfer commands.

By executing the two pairs of sense and data transfer commands in accordance with the read cache sequence as opposed to the "normal" sequence, the storage module controller 110 may utilize the bus 146 while the non-volatile memory module 130 is performing an internal sense operation. For example, the storage module controller 110 may issue the second sense command on the bus 146 while the non-volatile memory module 130 is performing a first sense operation in response to receipt of the first sense command. In addition or alternatively, the storage module controller 130 may execute the first data transfer command by toggling data on the bus 146 while the non-volatile memory module 130 is performing a second sense operation in response to receipt of the second sense command.

Figure 2:
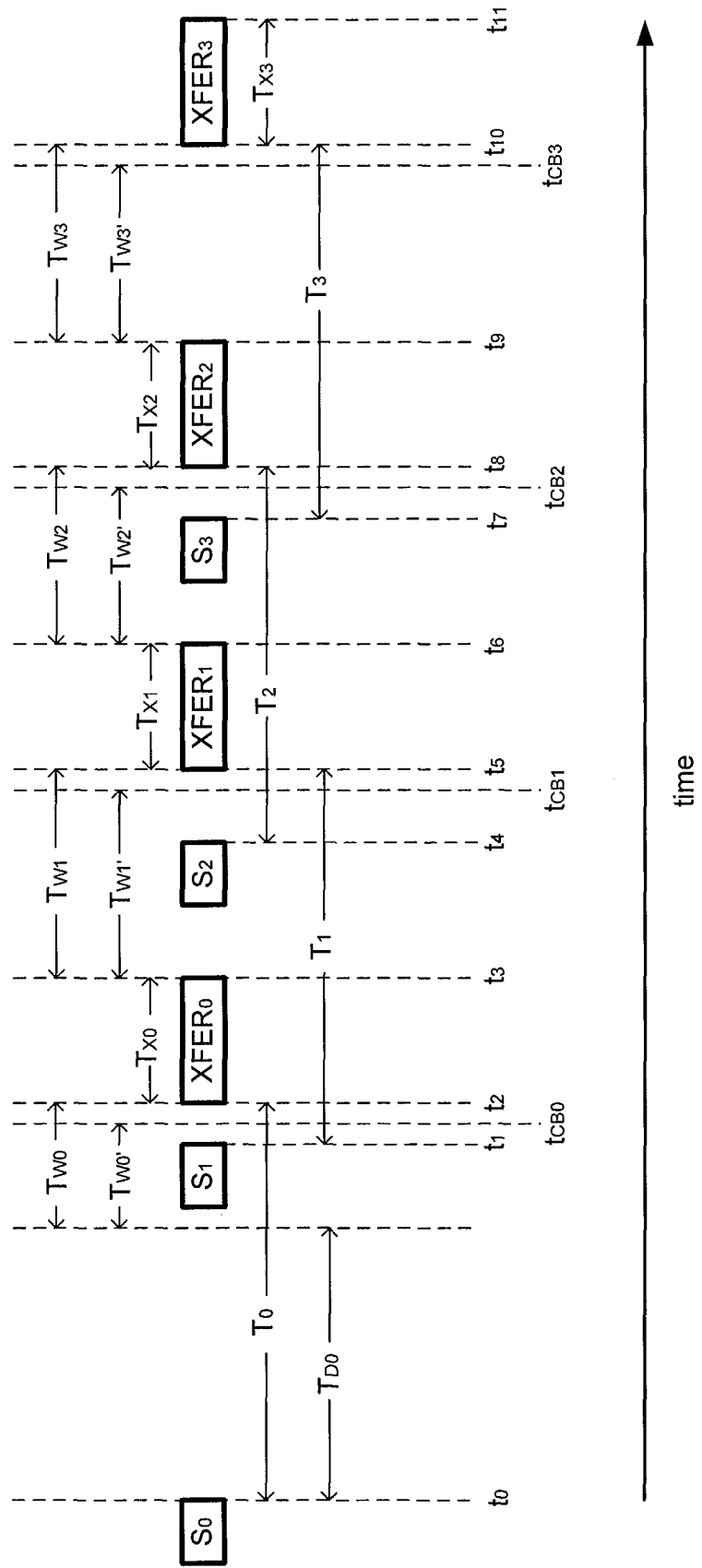
FIG. 2 is a timing diagram of a plurality of sets of context commands being executed on a communications bus in accordance with a read cache sequence.

Because the cache sequence includes issuing the two sense commands on the bus 146 before issuing either of the data transfer commands, then in general, under the cache sequence, a next sense command is issued on the bus 146 before the prior data transfer command is executed, which may be the case for any number of pairs of sense and data transfer commands. FIG. 2 shows an example timing diagram of four pairs of sense and data transfer commands being executed on the bus 146 in accordance with a read cache sequence for a particular memory area, such as the first memory area 134, as an example. The four pairs of sense and data transfer commands may be generated by the storage module controller 110 in response to receipt of one or more read commands from the host that require the pairs of commands to be generated in order to execute the one or more host read commands.

In particular, for the example timing diagram shown in FIG. 2, at a first time $t_0$, a first sense command $S_0$ is issued on the bus 146. At a second time $t_1$, a second sense command $S_1$ is issued on the bus 146. Execution of a first data transfer command $XFER_0$ begins at a third time $t_2$ and ends at a fourth time $t_3$, and data associated with the first data transfer command $XFER_0$ is transferred on the bus 146 from the non-volatile storage module 130 to the storage module controller 110 over a time period $T_{X0}$ between the third and fourth times $t_2$, $t_3$. At a fifth time $t_4$, a third sense command $S_2$ is issued on the bus 146. Execution of a second data transfer command $XFER_1$ begins at a sixth time $t_5$ and ends at a seventh time $t_6$, and data associated with the second data transfer command $XFER_1$ is transferred on the bus 146 from the non-volatile storage module 130 to the storage module controller 110 between the sixth and seventh times $t_5$, $t_6$ over a time period $T_{X1}$. At an eighth time $t_7$, a fourth sense command $S_3$ is issued on the bus 146. Execution of a third data transfer command $XFER_2$ begins at a ninth time $t_8$ and ends at a tenth time $t_9$, and data associated with the third data transfer command $XFER_2$ is transferred on the bus 146 from the non-volatile storage module 130 to the storage module controller 110 between the ninth and tenth times $t_8$, $t_9$ over a time period $T_{X2}$. Execution of a fourth transfer command $XFER_3$ begins at an eleventh time $t_{10}$ and ends at a twelfth time $t_{11}$, and data associated with the fourth transfer command $XFER_3$ is transferred on the bus 146 from the non-volatile storage module 130 to the storage module controller 110 between the eleventh and twelfth times $t_{10}$, $t_{11}$ over a time period $T_{X3}$.

In order for the storage module controller 110 to execute the pairs of sense and data transfer commands in accordance with the read cache sequence, execution of sense and associated data transfer commands of each pair may be separated by a predetermined time period $T_n$. Otherwise stated, upon issuance of a sense command $S_n$ on the bus 146, the storage module controller 110 may wait or "procrastinate" for a predetermined time period $T_n$ before executing the associated data transfer command $XFER_n$. The predetermined time period $T_n$ may correspond to a period of time during which the non-volatile memory module 130 is performing an internal sense operation. That is, after the storage module controller 110 issues a sense command $S_n$ on the bus 146, the predetermined time period $T_n$ may correspond to an amount of time that the storage module controller 130 is configured to wait for the non-volatile storage module 130 to sense the data associated with the sense command $S_n$ before the storage module controller 110 toggles the sensed data on the bus 146.

In the example timing diagram shown in FIG. 2, after issuing the first sense command $S_0$, the storage module controller 110 may wait a first predetermined time period $T_0$ until commencing execution of the first data transfer command $XFER_0$; after issuing the second sense command $S_1$, the storage module controller 110 may wait a second predetermined time period $T_1$ until commencing execution of the second data transfer command $XFER_1$; after issuing the third sense command $S_2$ the storage module controller 110 may wait a third predetermined time period $T_2$ until commencing execution of the third data transfer command $XFER_2$; and after issuing the fourth sense command $S_3$, the storage module controller 110 may wait a fourth predetermined time period $T_3$ until commencing execution of the fourth data transfer command $XFER_3$. FIG. 2 shows the predetermined time periods $T_n$ being the same in duration, although in alternative timing diagrams, one or more of the periods $T_n$ may be different from each other.

For some example configurations, the storage module controller 110 may be configured to perform a status check on the non-volatile memory module 130 and/or the latches 144 in response to expiration of the predetermined time period $T_n$ and/or before executing the associated data transfer command $XFER_n$. The status check may identify whether the latches 144 are ready for and/or are able to transfer data associated with the data transfer command $XFER_n$. If the status check indicates that the latches 144 are ready, then the storage module controller 110 may execute the data transfer command $XFER_n$. Alternatively, if the status check indicates that the latches 144 are not ready, then the storage module controller 110 may perform a polling operation to determine whether to switch to a different memory area 134-140 to perform other operations.

The more and more times that the latches 144 are not ready, the more and more times that the controller 110 may perform status checks and polling operations to determine whether the latches 144 are ready and whether to switch to a different memory area 134-140. As such, the predetermined time period $T_n$ may be set to a sufficient duration such that the likelihood that the latches 144 are ready upon expiration of the predetermined time period $T_n$ is maximized and/or the number of times that a status check yields a non-ready response and that polling operations are performed are minimized. That is, upon expiration of the predetermined time period $T_n$, the storage module controller 110 may perform a status check to determine whether the latches 144 to perform a data transfer. The predetermined time period $T_n$ may be set to a sufficient length or duration such that the most common occurrence is that the status check identifies that the latches 144 are ready and no further status checks or polling operations are performed before executing the data transfer command $XFER_n$. Conversely, without setting a predetermined time period $T_n$ or setting a predetermined time period $T_n$ that does not have a sufficient duration, the storage module controller 110 may not have an adequate benchmark or gauge as to when to perform a status check, which in turn may lead to an increased number of status checks and polling operations, thus resulting in an increased amount of power consumption.

The storage module controller 110 may be configured with a counter or timer (or a plurality of counters or timers) to determine the predetermined time periods $T_n$ and when the predetermined time periods $T_n$ start and expire. Upon issuance of a sense command $S_n$ on the bus 146, the storage module controller 110 may begin counting a predetermined number of times or to a predetermined number or value, and/or may start a timer. When the storage module controller 110 counts the predetermined number of times or to the predetermined number or value, or when the timer expires, the storage module controller 110 may determine that the predetermined time period $T_n$ expired and in response, may execute the associated data transfer command $XFER_n$.

In accordance with the read cache sequence, during a current predetermined time period $T_n$, a prior data transfer command $XFER_{n-1}$ may be executed. For example, as shown in FIG. 2, during the second (current) predetermined time period $T_1$, the first (prior) data transfer command $XFER_0$ may be executed; during the third predetermined (current) time period $T_2$, the second (prior) data transfer command $XFER_1$ may be executed; and during the fourth (current) predetermined time period $T_3$, the third (prior) data transfer command $XFER_2$ may be executed. Also, as shown in FIG. 2, a prior data transfer command may not be executed during the first time period $T_0$.

When executing context commands in accordance with a read cache sequence, after the storage module controller 110 executes a prior data transfer command $XFER_{n-1}$ to transfer data sensed from a memory area 134-140, the storage module controller 110 may be configured to utilize the bus 146 before executing a current data transfer command $XFER_n$. As examples, the storage module controller 110 may issue a next sense command $S_{n+1}$ to sense data on the same memory area 134-140. In addition or alternatively, the storage module controller 110 may switch to one or more different memory areas 134-140 and use the bus 146 to perform other operations associated with the different memory areas 134-140.

To determine whether and/or when to utilize the bus 146 before executing a current data transfer command $XFER_n$, the storage module controller 110 may determine a current opportunity window or time period $T_{Wn}$. The current opportunity time period $T_{Wn}$ may be a period of time that is bounded by and/or that extends in between the time that execution of the prior data transfer command $XFER_{n-1}$ ends and the time that execution of the current data transfer command $XFER_n$ begins. A maximum duration or length of the current opportunity time period $T_{Wn}$ may extend from the time that execution of the prior data transfer command $XFER_{n-1}$ ends to the time that the current data transfer command $XFER_n$ begins. To illustrate, in FIG. 2, the second opportunity window $T_{W1}$ may extend from the time $t_3$ that execution of the first data transfer command $XFER_0$ ends to the time $t_5$ that execution of the second data transfer command $XFER_1$ begins (i.e., the time difference between time $t_5$ and time $t_3$). Alternatively, the maximum length or duration may be shortened by a relatively short period of time immediately prior to when execution of the current data transfer command $XFER_n$ begins, referred to as a cache busy time period $T_{CBn}$, during which the non-volatile memory module 130 may be busy or otherwise unable to communicate information on the bus 146. Context commands or other communications may not be executed or otherwise communicated on the bus 146 by the storage module controller 110 during the cache busy time period $T_{CBn}$. For these alternative example configurations, the maximum length or duration of the current opportunity time period $T_{Wn}$ may be shortened by the cache busy time period $T_{CBn}$ to yield a shortened opportunity time period $T_{Wn'}$ during which the storage module controller 110 may utilize the bus 146. For example, as shown in FIG. 2, a shortened opportunity time period $T_{W1'}$ may extend from the time $t_3$ that execution of the prior data transfer command $XFER_0$ ends to the time $t_{CB1}$ that the cache busy time period $T_{CB1}$ begins. In general, a current opportunity time period $T_{Wn}$ may be any period of time that extends in between the time that execution of the prior data transfer command $XFER_{n-1}$ ends and the time that the current data transfer command $XFER_n$ begins and that the storage module controller 110 determines is a time period that is available for utilization of the bus 146.

During a current opportunity time period $T_{Wn}$, the storage module controller 110 may utilize the bus 146 by issuing a next sense command $S_{n+1}$ on the bus 146 as part of a read cache sequence. For example, as shown in FIG. 2, during the second (current) opportunity time period $T_{W1}$ (or $T_{W1'}$), the third (next) sense command $S_2$ may be issued on the bus 146; and during the third (current) opportunity time period $T_2$ (or $T_{W2'}$) the fourth (next) sense command $S_3$ may be issued on the bus 146.

For some example configurations, the storage module controller 110 may determine the opportunity time period $T_{Wn}$ based on a comparison of the time that execution of the prior data transfer command $XFER_{n-n}$ ends with the time at which the predetermined time period $T_n$ is set to expire. As previously described, the storage module controller 110 may activate a counter or timer upon issuance of a sense command $S_n$ to keep track of the predetermined time period $T_n$.

When execution of the prior data command $XFER_{n-1}$ is finished, the storage module controller 110 may compare the finish time with a current count or time kept by the counter or timer to determine an amount of time that remains and/or is available to utilize the bus 146 before execution of the current data transfer command $XFER_n$ begins. Based on the remaining amount of time, a corresponding opportunity time period $T_{Wn}$ may be determined, taking into consideration any cache busy time periods $T_{CBn}$ as appropriate.

In addition, in the example read cache sequence shown in FIG. 2, a fifth sense command $S_4$ is not issued during the fourth opportunity time period $T_{W3}$ as part of a read cache sequence because a fifth sense command $S_4$ is not generated for execution of the one or more host read commands. Should the storage module controller 110 determine to generate a fifth pair of sense command $S_4$ and data transfer command $XFER_4$, such as upon receipt of another host read command, the storage module controller 110 may determine whether the fifth sense command $S_4$ may be issued on the bus 146 during the fourth opportunity time period $T_{W3}$. If so, the storage module controller 110 may keep the read cache sequence open and issue the fifth sense command $S_4$ during the fourth opportunity time period $T_{W3}$. If not, the storage module controller 110 may execute the fourth data transfer command $XFER_3$ before issuing the fifth sense command $S_4$ on the data bus 146. Additionally, if a next sense command $S_{n+1}$ is not received and/or cannot be issued in the opportunity time period $T_{Wn}$, then the storage module controller 110 may determine to terminate the read cache sequence. For example, in FIG. 2, if the fifth sense command $S_4$ is not received and/or cannot be issued in the fourth opportunity time period $T_{W3}$, then the storage module controller 110 may determine to terminate the read cache sequence.

Further, as shown in FIG. 2, under the read cache sequence, there may not be a prior data transfer command for the storage module controller 110 to issue during the predetermined time period $T_0$ after issuing the first sense command $S_0$. As such, an opportunity window $T_{W0}$ (or $T_{W0'}$) extending in the first predetermined time period $T_0$ may not be determined from a time that execution of a prior data transfer command finished. However, even though a prior data transfer command may not be executed during the first predetermined time period $T_0$, for some example configurations, the storage module controller 110 may be configured to delay issuance of the second sense command $S_1$ for an initial time delay period $T_{D0}$. For some example configurations, the initial time delay period $T_{D0}$ may be due to an initial cache busy time period that occurs after issuing the first sense command $S_0$, which may be relatively longer compared to the other cache busy time periods $T_{CBn}$ and which may prevent the storage module controller 110 from issuing the second sense command $S_1$. In addition or alternatively, the storage module controller 110 may delay issuance of the second sense command $S_1$ an appropriate or suitable amount of time so that execution of the associated first and second data transfer commands $XFER_0$ and $XFER_1$ are sufficiently spaced apart from each other to determine an opportunity time period $T_{W1}$ (or $T_{W1'}$) of sufficient length. The initial time delay period $T_{D0}$ and the first predetermined time period $T_0$ may determine a first opportunity window $T_{W0}$ (or $T_{W0'}$) during which the second sense command $S_1$ and/or context commands for other memory areas may be executed on the bus 146.

In addition, although the timing diagram in FIG. 2 shows a plurality of (e.g., four) pairs of sense and data transfer commands being executed on the bus 146 in accordance with a read cache sequence, for alternative situations, the storage module controller 110 may determine to generate only a single pair of sense and data transfer commands upon receipt of a host read command. For these alternative situations, the storage module controller 110 may nonetheless be configured to execute the single pair of sense and data transfer commands in accordance with the read cache sequence, as opposed to a "normal" execution sequence. That is, after issuing the first sense command $S_0$, the storage module controller 110 may be configured to delay execution of the first data transfer command $XFER_0$ for the predetermined time period $T_0$. Subsequently, if the storage module controller 110 determines to issue a second sense command $S_1$, such as upon receipt of another host read command, and if the storage controller module 110 determines that it is able to issue the second sense command $S_1$ during the first opportunity time period $T_{W0}$ (or $T_{W0'}$), then the storage module controller 110 may utilize the bus 146 before executing the first data transfer command $XFER_0$. In contrast, under a "normal" read sequence, if the storage module controller 146 determines to generate only a single pair of sense and data transfer commands $S_0$ and $XFER_0$, then the storage module controller 110 may determine to wait until after execution of the first data transfer command $XFER_0$ before issuing the second sense command $S_1$, even if there is enough time to do so before executing the first data transfer command $XFER_0$. By configuring the storage module controller 110 to execute pairs of sense and data transfer commands in accordance with the read cache sequence instead of the "normal" execution sequence, even if the storage module controller 110 determines to generate only a single pair of sense and data transfer commands, the read cache sequence, rather than the "normal" execution sequence, may be considered the default execution sequence for the storage module controller 110.

In addition, for some example configurations, the storage module controller 110 may be configured to generate and/or add a last pair of sense and data transfer commands to the cache sequence as a dummy pair of sense and data transfer commands. A dummy pair of sense and data transfer commands may be a pair of sense and data transfer commands in which the data transfer command is not executed. That is, data that is sensed in response to a dummy sense command is not transferred on the data bus 146 back to the storage module controller 110. The dummy sense command may be implemented in various ways. In one way, the dummy sense command may instruct the memory controller 142 to re-sense a portion (e.g., one or more addresses) of the memory area—i.e., perform a sense operation on a portion of the memory area that it already sensed during the read cache sequence. Alternatively, the dummy sense command may instruct the memory controller 142 to perform a sense operation on an invalid portion (e.g., one or more invalid addresses) of the memory area. Other ways to implement a dummy sense command may be possible.

The storage module controller 110 may be configured to generate and/or add a dummy pair of sense and data transfer commands to the read cache sequence as a termination pair for the read cache sequence. To illustrate, using the timing diagram in FIG. 2, suppose that the storage module controller 110 determines to generate three pairs of sense and data transfer commands $S_0$, $XFER_0$; $S_1$, $XFER_1$; and $S_2$, $XFER_2$ for data to be sensed and tranferred from the first memory area 134. In addition to generating the three pairs of sense and data transfer commands, the storage module controller 110 may also determine to generate a fourth pair of sense and data transfer commands $S_3$, $XFER_3$ as a dummy pair to terminate the read cache sequence. The storage module controller 110 may issue the dummy sense command $S_3$ during the opportunity time period $T_{W2}$ before executing the third data transfer command XFER$_2$ at time $t_8$. Then, at time $t_{10}$ when the timer associated with the dummy sense command $S_3$ expires, the dummy data transfer command XFER$_3$ may not be executed (or data sensed from the first memory area 134 in response to the dummy sense command $S_3$ may be not transferred on the bus 146), and the read cache sequence may be terminated.

In furtherance of the illustration, if, on the other hand, a fourth host read command associated with the first memory area 134 is received before the dummy sense command $S_3$ is issued, then the data module controller 110 may determine whether a sense command associated with the fourth host read command may be issued on the bus 146 during the opportunity time period $T_{W2}$. If so, then the storage module controller 110 may replace the dummy pair of sense and data transfer commands $S_3$, XFER$_3$ with a new pair of sense and data transfer commands that are associated with the fourth host read command. Additionally, the timer or counter associated with the dummy sense command $S_3$ may be removed and replaced with a new timer or counter, or alternatively reset and restarted, once the new sense command is issued on the bus 146. Further, for some example configurations, a fifth dummy pair of sense and data transfer commands may be added to the read cache sequence to terminate (or re-terminate) the read cache sequence. Alternatively, a dummy fifth pair of sense and data transfer commands may not be added, and the read cache sequence may terminate after the new fourth data transfer command is executed.

Still in furtherance of the illustration, if, alternatively, a fourth host command is received, but it is a host command other than a host read command (e.g., a host write command, an erase command, or a test mode command as examples), then the storage module controller 110 may not replace the dummy pair of sense and data transfer commands $S_3$, XFER$_3$ with a new pair. Instead, the storage module controller 110 may maintain issuance of the dummy sense command $S_3$, toggle data associated with the third data transfer command XFER$_2$, and then terminate the read cache sequence by withholding the toggling of data associated with the dummy transfer command XFER$_3$.

In alternative example configurations, dummy pairs of sense and data transfer commands may not be added to a read cache sequence to terminate the sequence. Instead, the read cache sequence may terminate when data associated with the last data transfer command is transferred on the bus 146 to the storage module controller 110 without any dummy pairs being added to the end of the read cache sequence.

In addition or alternatively to issuing a next sense command $S_{n+1}$ during a current opportunity time period $T_{Wn}$, the storage module controller 110 may utilize the bus 146 during a current opportunity time period $T_{Wn}$ by executing one or more different context commands (e.g., an erase command, a check status command, or a sense command as examples) for one or more memory areas 134-140 different than the memory area 134-140 for which the storage module controller 110 is executing the pairs of sense and data transfer commands under the read cache sequence.

To illustrate, suppose the sense commands $S_1$, and data transfer commands XFER$_n$ shown in FIG. 2 are associated with the first memory area 134. That is, the sense and data transfer commands $S_n$, XFER$_n$ are executed to sense and obtain data stored in the first memory area 134. In one example, when the storage module controller 110 issues the second sense command $S_1$, the memory controller 142 may perform a corresponding sense operation on the first memory area 134 and during the predetermined time period $T_1$, the storage module controller 110 may issue the third sense command $S_2$. After issuing the third sense command $S_2$, the storage module controller 110 may determine that there is still time remaining in the opportunity window $T_{W1}$ (or the shortened opportunity window $T_{W1'}$) before the second data transfer command XFER$_1$ is to be executed, such as between time $t_4$ and time $t_5$ (or time $t_{CB1}$). The storage module controller 110 may be configured to utilize this remaining time by switching to one or more of the second, third or fourth memory areas 136-140 and executing other commands or performing other operations on the bus 146 that are associated with the second, third, or fourth memory areas 136-140. Then, at time $t_5$ (or alternatively at time $t_{CB1}$), the storage module controller 110 may switch back to the first memory area 134 and execute the second data transfer command XFER$_1$. In addition or alternatively, the storage module controller 110 may switch to the other second, third, or fourth memory areas 136-140 before issuing the second sense command $S_2$. For example, rather than issue the third sense command $S_2$ as close to execution of the first data transfer command XFER$_0$ as possible, the storage module controller 110 may wait to issue the third sense command $S_2$ at a later time within the opportunity window $T_{W1}$ (or $T_{W1'}$) and execute context commands for one or more of the other memory areas 136-140 before issuing the third sense command $S_2$.

As another example, after issuing a sense command $S_n$ on the bus 146 for the first memory area 134, if the storage module controller 110 determines that there is not a next sense command $S_{n+1}$ to issue on the bus 146 for the first memory area 134, the storage module controller 110 may nonetheless execute context commands for the other memory areas 136-140, provided such context commands are available for execution. For example, after the storage module controller 110 issues the fourth sense command $S_3$, the storage module controller 110 may determine that there is not a fifth sense command $S_4$ to issue. Nonetheless, if the storage module controller 110 determines that there are context commands to execute for the other memory areas 136-140, the storage module controller 110 may switch to the other memory areas 136-140 and execute those context commands during the opportunity window $T_{W3}$ (or $T_{W3'}$).

For some example configurations, the storage module controller 110 may be configured to determine and/or decide, such as at a context arbiter level, whether to switch to a different memory area 134-140 to execute the different context commands for the different memory areas 134-140 during a current opportunity time period $T_{Wn}$. For some example configurations, the storage module controller 110 may determine whether to switch to a different memory area 134-140 using the firmware module 120 and/or using arbitration decision flags.

In general, regardless of the number of pairs of sense and data transfer commands that the storage module controller 110 determines to generate for a particular memory area in order to fully execute one or more host read commands, for each pair of a sense command $S_n$ and a data transfer command XFER$_n$, the storage module controller 110 may be configured to delay execution of the data transfer command XFER$_n$ for a predetermined period of time $T_n$ after issuing the sense command $S_n$, during which time the storage module controller 110 may execute on the bus 146 other commands that are not associated with the sense command $S_n$ and/or that are not part of the same set of context commands as the sense command $S_n$, which may include a prior data transfer command $XFER_{n-n}$, a next sense command $S_{n+1}$, or other commands for other memory areas.

As previously described, the storage module controller 110 may determine to begin execution of the current data transfer command $XFER_n$ when the current predetermined time period $T_n$ expires. Accordingly, an upper bound (or right-most edge) of the current opportunity time period $T_{Wn}$ may be the same as and/or track the time that the current predetermined time period $T_n$ expires. To illustrate, in FIG. 2, the upper bound of the second opportunity time period $T_{W1}$ occurs at time $t_5$ when the second predetermined time period $T_2$ expires and execution of the second data transfer command $XFER_1$ begins. Similarly, the upper bound of the alternative second opportunity time period $T_{W1'}$ occurs at the start of the cache busy time period $T_{CB1}$ before the second predetermined time period $T_2$ expires.

The predetermined time periods $T_n$ may be set to a sufficient length or duration such that when the storage module controller 110 utilizes the bus 146 during the opportunity time periods $T_{Wn}$ while executing context commands under a read cache sequence, the bus 146 and/or the non-volatile memory module 130 is utilized by the storage module controller 110 with improved efficiency compared to configurations where the storage module controller 110 utilizes the bus 146 while executing context commands under a "normal" read sequence. For some example configurations, the predetermined time period $T_n$ may be set such that when the storage module controller 110 utilizes the bus 146 in the opportunity window $T_{Wn}$ prior to expiration of the predetermined time period $T_n$, the storage module controller 110 utilizes the bus and/or the non-volatile memory module 130 with maximum (i.e., 100%) efficiency. That is, if the storage module controller 110 utilizes the bus 146 in the opportunity window $T_{Wn}$ before expiration of the predetermined time period $T_n$, the storage module controller 110 utilizes the bus 146 and/or the non-volatile memory module 130 with maximum efficiency. Conversely, if the storage module controller 110 utilizes the bus 146 outside of the opportunity window $T_{Wn}$ after expiration of the predetermined time period $T_n$, the storage module controller 110 utilizes the bus 146 and/or the non-volatile memory module 130 with less than maximum (i.e., less than 100%) efficiency.

For alternative example configurations, the predetermined time period $T_n$ may be set such that when the storage module controller 110 utilizes the bus 146 in the opportunity window $T_{Wn}$ prior to expiration of the predetermined time period $T_n$, the bus 146 and/or the non-volatile storage module 130 is utilized with at least some (i.e., greater than 0%) improved efficiency compared to if the storage module controller 110 utilized the bus 146 while executing context commands under the "normal" read sequence. That is, if the storage module controller 110 utilizes the bus 146 in the opportunity window $T_{Wn}$ before expiration of the predetermined time period $T_n$, the storage module controller 110 utilizes the bus 146 and/or the non-volatile memory module 130 with at least some improved efficiency. Conversely, if the storage module controller 110 utilizes the bus 146 outside of the opportunity window $T_{Wn}$ after expiration of the predetermined time period $T_n$, then the storage module controller 110 utilizes the bus 146 and/or the non-volatile memory module 130 with worse efficiency than if the storage module controller 110 executed the context commands under the "normal" read sequence.

For either of the above example configurations, after the storage module controller 110 executes the prior data transfer command $XFER_{n-1}$, the storage module controller 110 may determine whether it has an operation or function to perform that utilizes the bus 146 and/or the non-volatile storage module 130. If so, and if the storage module controller 110 determines that it is able to perform the operation or function on the bus 146 in the opportunity time period $T_{Wn}$ before the predetermined time period $T_n$ expires, then the storage module controller 110 may utilize the bus 146 to perform the operation or function. Alternatively, if the storage module controller 110 determines that it is unable to perform the operation or function on the bus 146 in the opportunity time period $T_{Wn}$ before the predetermined time period $T_n$ expires, the storage module controller 110 may refrain from utilizing the bus 146 and performing the operation or function. For this alternative situation, the storage module controller 110 may determine to close out the read cache sequence after executing the data transfer command $XFER_n$.

Figure 2A:
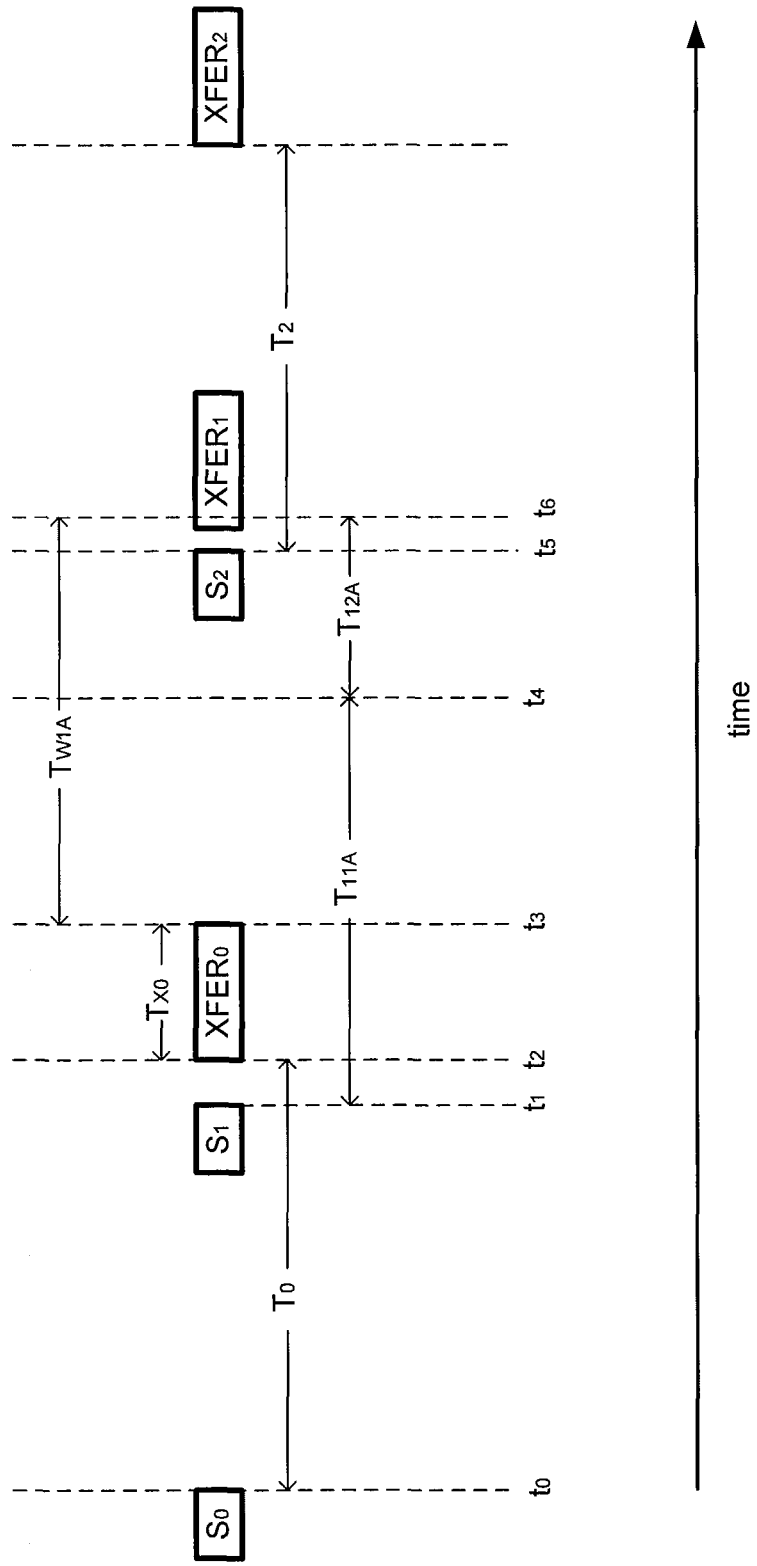
FIG. 2A is a timing diagram of a plurality of sets of context commands being executed on a communications bus in accordance with another read cache sequence.

FIG. 2A shows a timing diagram of another alternative example configuration that combines the above two example. In particular, the storage module controller 110 may determine an opportunity window $T_{WnA}$ that extends across two predetermined time periods before executing a current data transfer command $XFER_n$. A first predetermined time period $T_{n1A}$ may begin when and/or after execution of the prior data transfer command $XFER_{n-1}$ ends, and may be set to expire at a latest time when the storage module controller 110 may utilize the bus 146 and/or the non-volatile memory module 130 with maximum and/or 100% efficiency. A second predetermined time period $T_{n2A}$, which may be referred to as a grace period, may begin when the first predetermined time period $T_{n1A}$ ends and may expire at a latest time when the storage module controller 100 may utilize the bus 146 and/or the non-volatile memory module 130 with a threshold level of improved efficiency. The threshold level of improved efficiency may be any level less than 100% and greater than or equal to 0%. If the storage module controller 110 utilizes the bus 146 during the second predetermined time period $T_{n2A}$, the bus 146 and/or the non-volatile memory module 130 may be utilized with some but less than maximum efficiency.

For the alternative example configuration shown in FIG. 2A, after executing the prior data transfer command $XFER_{n-1}$, if the storage module controller 110 determines that it has an operation or function to perform that utilizes the bus 146, and if the storage module controller 110 determines that it is able to perform the operation or function in the first predetermined time period $T_{n1A}$, then the storage module controller 110 may utilize the bus 146 and perform the operation or function. Alternatively, if the storage module controller 110 determines it is unable to perform the operation or function in the first predetermined time period $T_{n1A}$, then the storage module controller 110 may determine whether it is able to perform the operation or function in the second predetermined time period $T_{n2A}$. If not, then the storage module controller 110 may execute the current data transfer command $XFER_n$ without utilizing the bus 146 to perform the operation or function. The storage module controller 110 may begin execution of the current data transfer command $XFER_n$ when the first predetermined time period $T_{n1A}$ expires, or at least at a time before expiration of the second predetermined time period $T_{n2A}$. Alternatively, if the storage module controller 110 determines that it is able to perform the operation or function during the second predetermined time period $T_{n2A}$, then the storage module controller 110 may delay execution of the current data transfer command $XFER_{n-1}$ upon expiration of the first predetermined time period $T_{n1A}$, and perform the operation or function during the second predetermined time period $T_{n2A}$. Then, at a delayed time following performance of the operation or function, the storage module controller 110 may execute the current data transfer function $XFER_n$. For some example configurations, the storage module controller 110 may perform the current data transfer function $XFER_{n-1}$ as soon as possible following performance of the operation or function. Alternatively, the storage module controller 110 may wait until the second predetermined time period $T_{n2A}$ expires until executing the current data transfer function $XFER_n$.

To illustrate, after issuing a second sense command $S_1$ on the bus 146 at time $t_1$, a first predetermined time period $T_{11A}$ may begin, during which time the storage module controller 110 may execute a prior data transfer command $XFER_n$. The storage module controller 110 may determine a next sense command $S_2$ to issue on the bus 146, but may determine that it is unable to issue the next sense command $S_2$ before expiration of the first predetermined time period $T_{11A}$ at time $t_4$. However, the storage module controller 110 may determine that it is able to issue the next sense command $S_2$ in a second predetermined time period $T_{12A}$ that begins after expiration of the first predetermined time period $T_{11A}$. Accordingly, the storage module controller 110 may delay execution of the current data transfer command $XFER_1$ upon expiration of the first predetermined time period $T_{11A}$ at time $t_4$, and may issue the next sense command $S_2$ at time $t_5$ during the second predetermined time period $T_{12A}$. After issuing the next sense command $S_2$, the storage module controller 110 may execute the current data transfer command $XFER_1$. In this way, even though the storage module controller 110 could not issue the next sense command $S_2$ during a time period that yields use of the bus 146 and/or the non-volatile memory module 130 with maximum efficiency, by delaying execution of the current data transfer command $XFER_1$ and issuing the next sense command $S_2$ during the second predetermined time period $T_{12A}$, at least some improvement in efficiency (e.g., greater than 0%) is experienced compared to if the storage module controller 110 executes the current data transfer command $XFER_1$ upon expiration of the first predetermined time period $T_{11A}$ and then issues the next sense command $S_2$ after executing the current data transfer command $XFER_1$.

Otherwise put, after the storage module controller 110 executes the prior data transfer command $XFER_0$ at time $t_3$, the storage module controller 110 may determine an opportunity time period $T_{W1A}$ that spans the two predetermined time periods $T_{11A}$ and $T_{12A}$. As long as the storage module controller issues the next sense command $S_2$ in one of the two predetermined time periods $T_{11A}$ and $T_{12A}$ before executing the current data transfer command $XFER_1$, the storage module controller 110 may utilize the bus 146 and/or non-volatile memory module 130 with at least some improved efficiency than if the storage module controller 110 issued the next sense command $S2$ after executing the current data transfer command $XFER_1$ upon expiration of the first predetermined time period $T_{11A}$.

In addition or alternatively to issuing the next sense command $S_2$, the storage module controller 110 may switch to one or more different memory areas 134-140 and perform one or more operation or functions on the one or more different memory areas 134-140. The storage module controller 110 may be configured to utilize or not utilize the second predetermined time or grace period $T_{12A}$ in various ways, which may depend on the function or operation to be performed on the bus 146 and/or the number of functions or operations. For example, the storage module controller 110 may be configured to delay execution of the current data transfer command $XFER_1$ and perform an operation or function during the grace period $T_{12A}$ only if the operation or function includes execution of a context command that is part of the read cache sequence, such as issuance of the next sense command $S_2$. That is, if the only operations or functions to be performed during the grace period $T_{12A}$ includes switching to a different memory area 134-140, then the storage module controller 110 may determine not to switch to the different memory area 134-140, and instead may execute the current data transfer command $XFER_1$ upon expiration of the first predetermined time period $T_{11A}$ without delay. Then, after executing the current data transfer command $XFER_1$, the storage module controller 110 may switch to the other memory area 134-140 to perform the operations or functions. Alternatively, even if the only operations or functions to be performed during the grace period $T_{12A}$ includes switching to one or more different memory areas 134-140, the storage module controller 110 may be configured to delay execution of the current data transfer command $XFER_1$ and switch to the different memory areas 134-140 to perform the operations or functions. After performing the operation or functions on the other memory areas 134-140, the storage module controller 110 may switch back to the initial memory area 134-140 and execute the current data transfer command $XFER_1$ at least by time $t_6$ that the opportunity time period $T_{W1A}$ expires.

The above description with respect to FIGS. 2 and 2A describe configurations of a storage module controller 110 executing commands in accordance with a read cache sequence. In addition, the storage module controller 110 may be configured to execute context commands in accordance with a write cache sequence. Execution of context commands under the write cache sequence may be similar to execution of context commands under a read cache sequence. As previously described, to execute a host write command, the storage module controller 110 may be configured to generate one or more associated sets of context commands, with each set including a program command, a data transfer command, and a status command. In accordance with the write cache sequence for a particular memory area, when the storage module controller 110 determines to execute two or more sets of context commands, the storage module controller 110 may execute two pairs of data transfer and program commands before issuing a first or initial status command included in the first set of context commands. Additionally, in accordance with the write cache sequence for a particular memory area, upon issuance of a current pair of data transfer and program commands, the storage module controller 110 may be configured to wait for a predetermined period of time before issuing an associated status command, during which time period the storage module controller may execute one or more context command not associated with and/or that are not part of the same set of context commands as the current pair of data transfer and program commands that were just executed. These non-associated context commands may include a prior status command, a next pair of data transfer and program commands, and/or a command associated with a different memory area.

Figure 3:
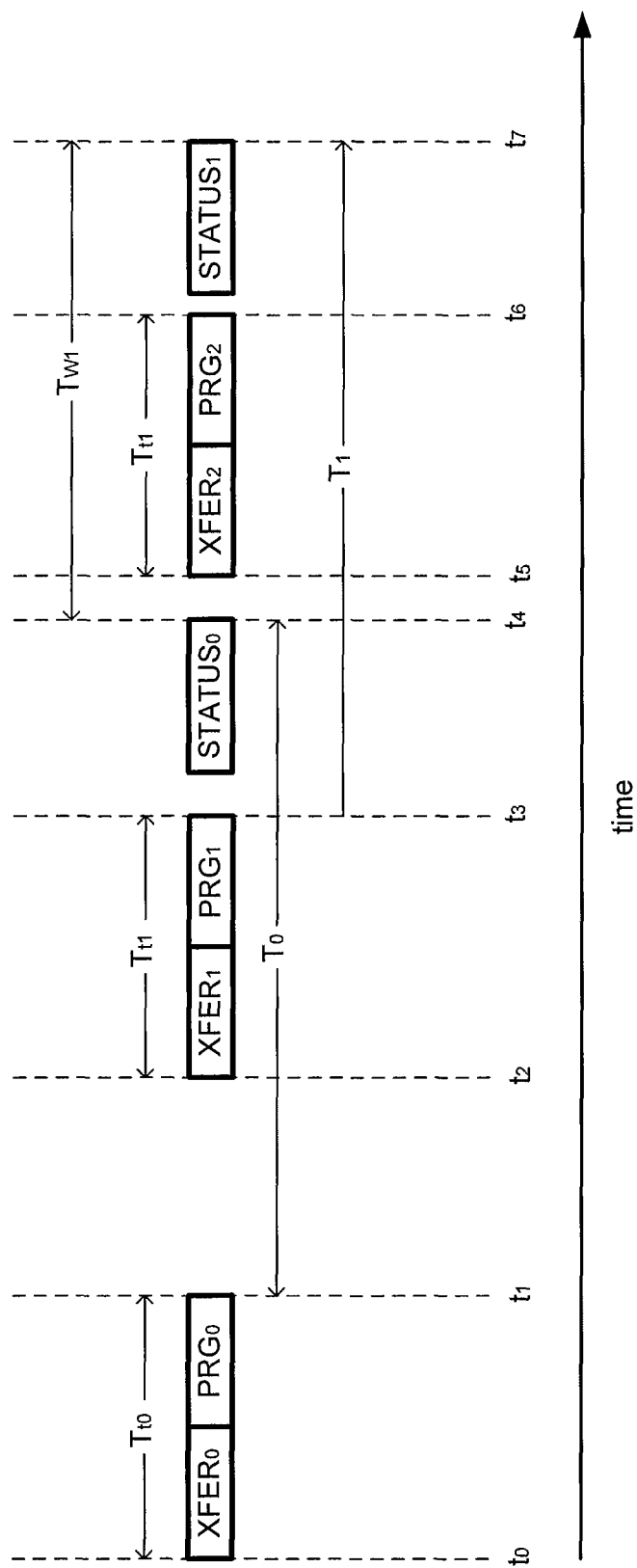
FIG. 3 is a timing diagram of a plurality of sets of context commands being executed on a communications bus in accordance with a write cache sequence.

FIG. 3 shows an example timing diagram of three sets of context commands associated with a particular memory area, such as the first memory area 134, that may be executed by the storage module controller 110 on the bus 146 in accordance with a write cache sequence. The sets of context commands may be generated, issued, and/or executed by the storage module controller 110 to execute one or more host write commands received from a host.

During a first transfer period $T_{r0}$ extending from time $t_0$ to time $t_1$, the storage module controller 110 may execute a first data transfer command $XFER_0$, transferring first data associated with the one or more host write commands on the bus 146 to the latches 144 of the non-volatile storage module 130. In addition, during the first transfer period $T_{r0}$, the storage module controller 110 may issue a first program command $PRG_0$ on the bus 146 to instruct the memory controller 142 to program the first data into the first memory area 134. After executing the first pair of data transfer and program commands $XFER_0$, $PRG_0$ on the bus 146, the storage module controller 110 may wait a predetermined time period $T_0$, during which time the non-volatile storage module 130 may be performing the associated program operation. When the predetermined time period $T_0$ expires at time $t_4$, the storage module controller 110 may issue a first status command $STATUS_0$ on the bus 146 to determine the status of the program operation. The storage module controller 110 may be configured to activate and/or initialize a timer or counter to determine the predetermined time period $T_0$ and/or when the predetermined time period $T_0$ starts and expires, as previously described.

During the predetermined time period $T_0$ and before issuing the first status command $STATUS_0$, the storage module controller 110 may be configured to execute a second pair of data transfer and program commands $XFER_1$, $PRG_1$ during a second transfer period $T_{r1}$ between time $t_2$ and time $t_3$ in accordance with the write cache sequence. Executing the second pair of data transfer and program command $XFER_1$, $PRG_1$ may transfer second data associated with the one or more host write commands on the bus 146 and program the second data in the first memory area 134. After executing the second pair of data transfer and program commands $XFER_1$, $PRG_1$, the storage module controller 110 may wait for a second predetermined time period $T_1$ before issuing a second status command $STATUS_1$ to determine the status of programming the second data. The storage module controller 110 may be configured to activate and/or initialize another timer or counter to determine the second predetermined time period $T_1$ and/or when the second predetermined time period $T_1$ starts and expires.

As shown in FIG. 3, during the second predetermined time period $T_1$, the storage module controller 110 may issue the first (or prior) status command $STATUS_0$ on the bus 146. In addition, the storage module controller 110 may determine an opportunity window or time period $T_{W1}$ extending between issuance of the first (prior) status command $STATUS_0$ at time $t_4$ and issuance of the current status command $STATUS_1$ at time $t_7$. After issuing the first (prior) status command $STATUS_0$, the storage module controller 110 may execute a third (next) pair of data transfer and program commands $XFER_2$, $PRG_2$ in the opportunity window or time period $T_{W1}$. In addition or alternatively, the storage module controller 110 may switch to one or more different memory areas (e.g., the second, third, or fourth memory area 136-140) and perform one or more functions or operations for the one or more different memory areas 136-140. Then, after performing the one functions or operations, the storage module controller 110 may switch back to the first memory area 134 to execute the second status command $STATUS_1$ upon expiration of the second predetermined time period $T_1$ at time $t_7$. By executing the second pair of data transfer and program commands $XFER_2$, $PRG_2$ and/or executing context commands for one or more different memory area during the opportunity time period $T_{W1}$, the storage module controller 110 may utilize the bus 146 and/or the non-volatile storage module 130 with at least some improved efficiency compared to configurations where the storage module controller 110 utilizes the bus 146 and/or the non-volatile storage module 130 while executing sets of context commands under a "normal" write sequence—i.e., next pairs of data transfer $XFER_{n+1}$ and program $PRG_{n+1}$ commands are not executed until after a current status command $STATUS_n$ is executed on the bus 146.

Figure 4A:
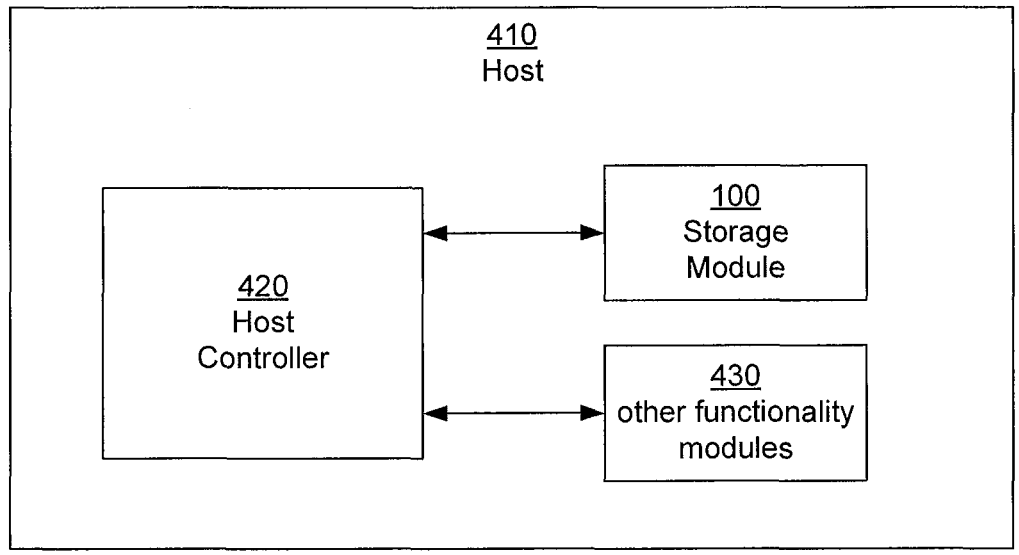
FIG. 4A is a block diagram of the storage module shown in FIG. 1 embedded in a host.
Figure 4B:
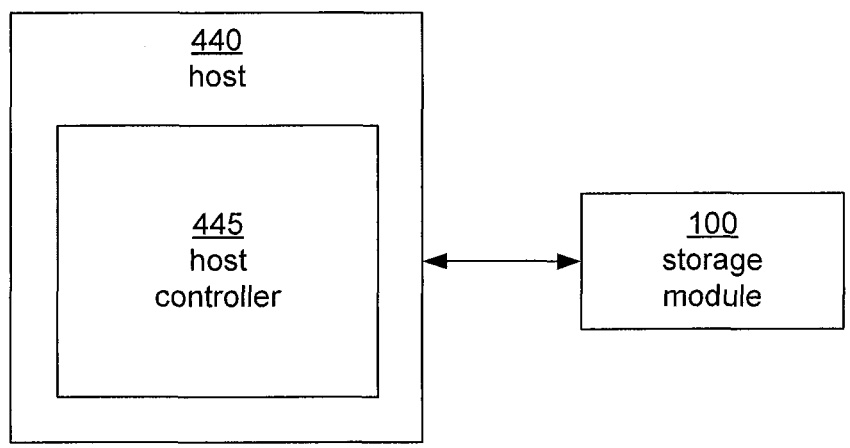
FIG. 4B is a block diagram of the storage module shown in FIG. 1 removably connected with a host.

For some example configurations, the storage module 100 may be implemented with a host by being an embedded device of the host or by being removably connected with a host. FIGS. 4A and 4B show these implementations. As shown in FIG. 4A, the storage module 100 may be embedded in a host 410. In addition to embedding the storage module 100, the host 410 may have a host controller 420. That is, the host 410 may embody the host controller 420 and the storage module 100, such that the host controller 420 interfaces with the embedded storage module 100 to manage its operations. For example, the storage module 100 can take the form of an iNAND™ eSD/eMMC embedded flash drive by SanDisk Corporation. The host controller 420 may interface with the embedded storage module 100 using the host interface 116 (FIG. 1). Additionally, when the storage module 100 is embedded in the host 410, some or all of the functions performed by the controller 110 in the storage module 100 may instead be performed by the host controller 420.

The host 410 can take any form, such as, but not limited to, a solid state drive (SSD), a hybrid storage module (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader, as examples. As shown in FIG. 4A, the host 410 can include optional other functionality modules 430. For example, if the host 410 is a mobile phone, the other functionality modules 430 can include hardware and/or software components to make and place telephone calls. As another example, if the host 410 has network connectivity capabilities, the other functionality modules 430 can include a network interface. These are just some examples, and other implementations can be used. Also, the host 410 can include other components (e.g., an audio output, input-output ports, etc.) that are not shown in FIG. 4A to simplify the drawing.

As shown in FIG. 4B, instead of being an embedded device in a host, the storage module 100 may have physical and electrical connectors that allow the storage module 100 to be removably connected to a host 440 (having a host controller 445) via mating connectors. As such, the storage module 100 may be a separate device from (and is not embedded in) the host 440. In this example, the storage module 100 can be a removable memory device, such as a Secure Digital (SD) memory card, a microSD memory card, a Compact Flash (CF) memory card, or a universal serial bus (USB) device (with a USB interface to the host), and the host 440 is a separate device, such as a mobile phone, a tablet computer, a digital media player, a game device, a personal digital assistant (PDA), a mobile (e.g., notebook, laptop) personal computer (PC), or a book reader, for example.

Figure 5:
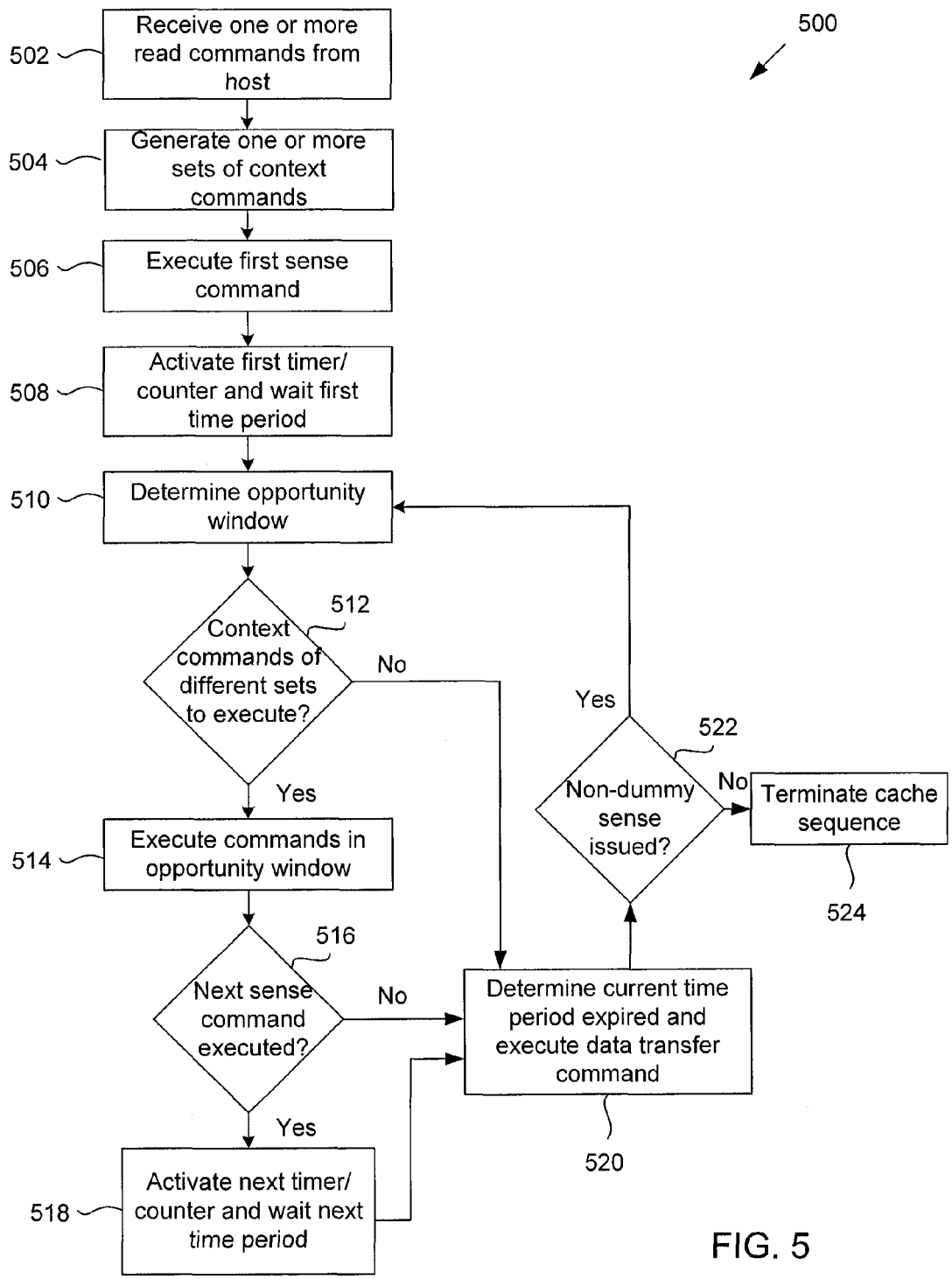
FIG. 5 is a flow chart of a method of executing context commands upon receiving host read commands.

FIG. 5 shows a flow chart of an example method 500 of executing a plurality context commands on a communications bus by a controller of a storage module in accordance with a read cache sequence. At block 502, the controller may receive one or more read commands from a host. At block 504, in response to the one or more read commands, the controller may generate one or more sets of context commands to execute on the communications bus in order to obtain data associated from a first memory area of non-volatile memory. Each set of context commands may include a pair of a sense command and a data transfer command.

At blocks 506 to 524, the controller may execute the one or more sets of context commands in accordance with the read cache sequence. At block 506, the controller may execute a first or initial sense command of a first set of context commands by issuing the first sense command on the communications bus. Upon issuance of the first sense command on the communications bus, a memory controller may perform an associated sense operation on the first memory area. At block 508, the controller may wait a first or current predetermined time period before executing an associated data transfer command of the first set of context commands. In addition, at block 508, the controller may activate a first timer or counter to determine the first or current predetermined time period and/or when the first or current predetermined time period expires.

At block 510, the controller may determine an opportunity window in the current predetermined time period. The opportunity window may be a time period during which one or more context commands may be executed on the bus while the sense operation is being performed on the first memory. Additionally, the opportunity window may be a period of time in between when a prior data transfer command and a current data transfer command are executed in accordance with the read cache sequence, during which use of the bus and/or the non-volatile memory may be utilized with at least some improved efficiency compared to if the controller utilized the bus and/or non-volatile memory while executing the context commands in accordance with a "normal" read sequence. The opportunity window may terminate when the current predetermined time period expires, or alternatively when a cache busy time occurring before execution of the associated data transfer command begins.

At block 512, the controller may determine whether there are context commands to execute on the communications bus during the opportunity window determined at block 510. An example context command may include a next sense command, such as a second or subsequent sense command, generated at block 504 from the received one or more host read commands to be issued in accordance with the read cache sequence. Alternatively, a next sense command may include a sense command generated in response to a new host read command (e.g., a host read command other than the one or more host read commands received at block 502), which may be received and/or identified by the controller after block 502 and/or block 504. Alternatively, for some example methods, a next sense command may include a dummy command if there are no next sense commands for which associated data is to be obtained. In addition or alternatively, an example context command may include a context command for another or different memory area other than the first memory area.

If the controller determines that there are no context commands to execute during the opportunity window at block 512, then the method 500 may proceed to block 520, where the controller may determine that the current predetermined time period expired. In addition, at block 520, when the controller determines that the current predetermined time period expired, the controller may execute the associated data transfer command, in which data sensed from the first memory area may be transferred to the controller.

Alternatively, at block 512, if one or more context commands are determined to be executed during the opportunity window, then at block 514, the controller may execute the one or more context commands on the communications bus during the opportunity window. In addition, at block 514, if there are multiple commands to execute, the controller may determine an order in which to execute them. For example, the controller may execute context commands for a different memory area before, after, or both before and after issuing a next sense command for the first memory area. At block 516, if none of the context commands executed at block 514 is a next sense command for the first memory area, then the method 500 may proceed to block 520, where the controller may determine that the current predetermined time period expired and execute the associated data transfer command. Additionally, at block 520, if the controller switched to a different memory area to perform an operation or function, then the controller may switch back to the first memory area to execute the associated data transfer command. Alternatively, at block 516, if one of the executed context commands at block 514 is a next sense command for the first memory area, then at block 518, the controller may wait a next predetermined time period upon issuing the next sense command. The controller may activate or initialize a next counter or timer to determine the next predetermined time period and/or when the next predetermined time period expires. The method 500 may then proceed to block 520, where the controller may determine that the current predetermined time period expired and execute the associated data transfer command.

At block 522, if the controller issued a next sense command in the opportunity window at block 514 and the next sense command was not a dummy command, then the method 500 may proceed back to block 510, where the controller may determine another opportunity window. At block 510, when determining another opportunity window (e.g., an opportunity window other than a first or initial opportunity window), the controller may factor in the time at which execution of the prior data transfer command at block 520 finished.

Alternatively, at block 522, if the controller did not issue a next sense command in the opportunity window at block 514 and/or the next sense command that was issued was a dummy command, then at block 524, the controller may terminate the read cache sequence.

Figure 6:
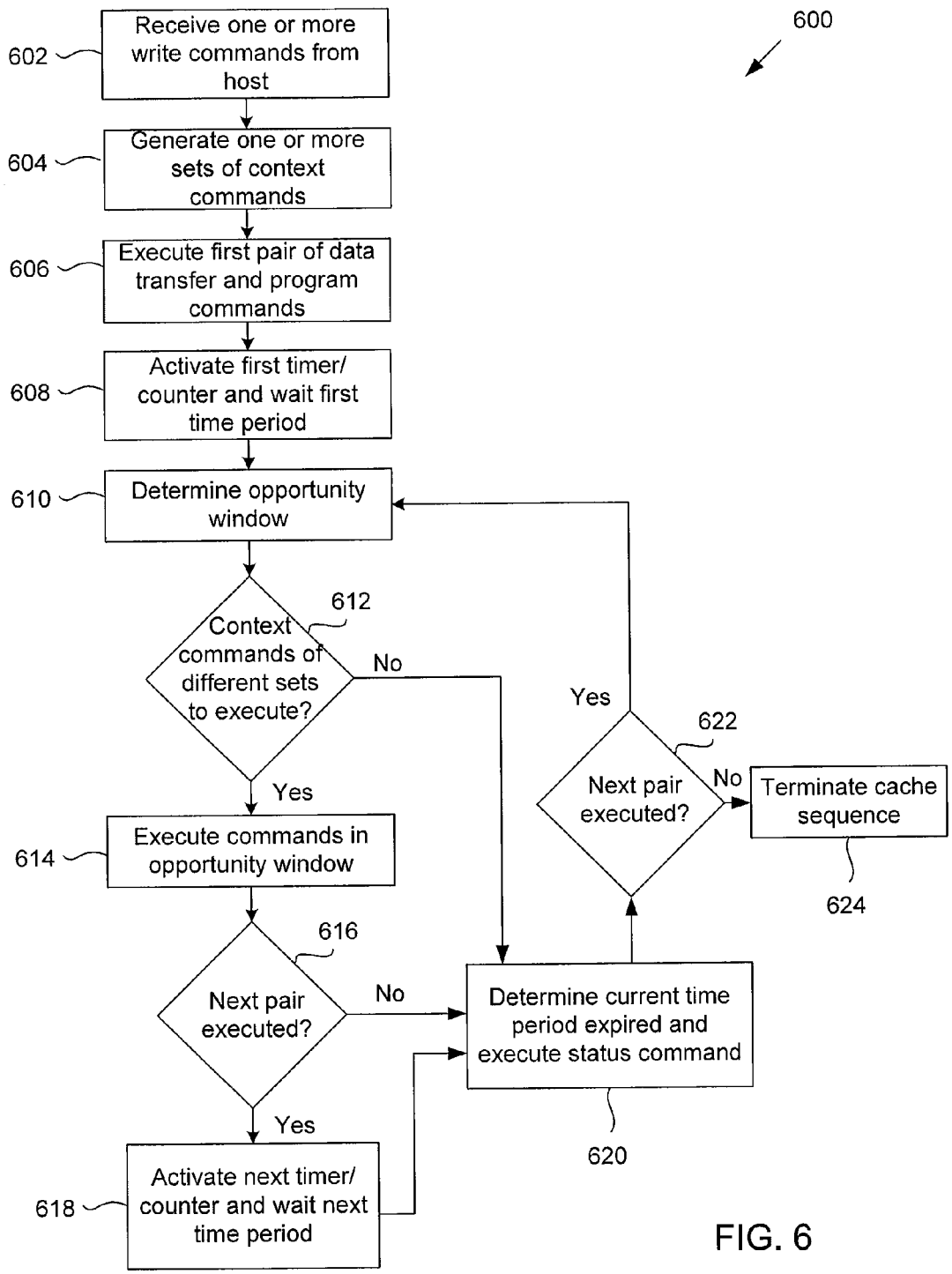
FIG. 6 is a flow chart of a method of executing context commands upon receiving host write commands.

FIG. 6 shows a flow chart of an example method 600 of executing a plurality context commands on a communications bus by a controller of a storage module in accordance with a write cache sequence. At block 602, the controller may receive one or write commands from a host. At block 604, in response to the one or more write commands, the controller may generate one or more sets of context commands to execute on the communications bus in order to program data associated with the one or more write commands on a first memory area of non-volatile memory. Each set of context commands may include a data transfer command, a program command, and a status command.

At blocks 606 to 624, the controller may execute the one or more sets of context commands in accordance with the write cache sequence. At block 606, the controller may execute a first or initial pair of first data transfer and first program commands by transferring data associated with the first data transfer command and issuing the first program command on the communications bus to a non-volatile memory module. Upon issuance of the first pair of data transfer and program commands on the communications bus, the non-volatile memory module may perform an associated program operation on the first memory area. At block 608, the controller may wait a first or current predetermined time period before executing an associated status command on the communications bus. In addition, at block 608, the controller may activate a first timer or counter to determine the first or current predetermined time period and/or when the first or current predetermined time period expires.

At block 610, the controller may determine an opportunity window in the current predetermined time period. The opportunity window may be a time period during which one or more context commands may be executed on the bus while the program operation is being performed on the first memory. Additionally, the opportunity window may be a period of time in between when a prior status command and a current status command are executed in accordance with the write cache sequence, during which use of the bus and/or the non-volatile memory may be utilized with at least some improved efficiency compared to if the controller utilized the bus and/or non-volatile memory while executing the context commands in accordance with a "normal" write sequence (i.e., where the controller issues a next pair of data transfer $XFER_{n+1}$ and program $PRG_{n+1}$ commands after issuing a current status command $STATUS_n$. The opportunity window may terminate when the current predetermined time period expires.

At block 612, the controller may determine whether there are context commands to execute on the communications bus during the opportunity window determined at block 610. An example context command may include a next pair of data transfer and program commands that were generated at block 604 from the received one or more host write commands. Alternatively, a next pair of data transfer and program commands may include a pair of data transfer and program commands generated in response to a new host write command (e.g., a host write command other than the one or more host write commands received at block 602), which may be received and/or identified by the controller after block 602 and/or block 604. In addition or alternatively, an example context command may include a context command for another or different memory area other than the first memory area.

If the controller determines that are no context commands to execute during the opportunity window at block 612, then the method 600 may proceed to block 620, where the controller may determine that the current predetermined time period expired. In addition, at block 620, when the controller determines that the current predetermined time period expired, the controller may execute the associated status command on the communications bus to determine whether the program command is successful.

Alternatively, at block 612, if one or more context commands are determined to be executed during the opportunity window, then at block 614, the controller may execute the context commands on the communications bus. In addition, at block 614, if there are multiple commands to execute, the controller may determine an order in which to execute them. For example, the controller may execute context commands for a different memory area before, after, or both before and after issuing a next pair of data transfer and program commands for the first memory area. At block 616, if none of the context commands executed at block 614 included a next pair of data transfer and program commands for the first memory area, then the method 600 may proceed to block 620, where the controller may determine that the current predetermined time period expired and execute the associated status command. Alternatively, at block 616, if one of the executed context commands at block 614 included a next pair of data transfer and program commands for the first memory area, then at block 618, the controller may wait a next predetermined time period upon issuing the next pair of data transfer and program command. The controller may activate or initialize a next counter or timer to determine the next predetermined time period and/or when the next predetermined time period expires. The method 600 may then proceed to block 620, where the controller may determine that the current predetermined time period expired and execute the associated status command.

At block 622, if the controller issued a next pair of data transfer and program commands in the opportunity window at block 614, then the method 600 may proceed back to block 610, where the controller may determine another opportunity window. At block 610, when determining another opportunity window (e.g., an opportunity window other than a first or initial opportunity window), the controller may factor in the time at which execution of the prior status command at block 620 finished.

Alternatively, at block 622, if the controller did not issue a next pair of data transfer and program command in the opportunity window at block 614, then at block 624, the controller may terminate the write cache sequence.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the present invention has been described in considerable detail with reference to certain embodiments thereof, other versions are possible. Therefore, the spirit and scope of the appended claims should not be limited to the description of the embodiments contained herein.

We claim:

1. A storage system comprising:
   a non-volatile memory comprising a plurality of memory areas, each of the plurality of memory areas being a different one of a plurality of memory dies; and
   a controller in communication with the non-volatile memory via a communications bus, the controller configured to:
   generate a plurality of sets of context commands associated with a first memory area of the plurality of memory areas, the plurality of sets of context commands generated for execution of one or more host commands;
   execute a first context command of a first set of the plurality of sets of context commands on the communications bus;
   after execution of the first context command of the first set and before execution of a second context command of the first set, execute a first context command of a second set of the plurality of sets of context commands on the communications bus;
   execute the second context command of the first set on the communications bus after execution of the first context command of the second set, wherein execution of the first context command of the second set and execution of the second context command of the first set causes an internal memory operation to be performed on the first memory area while data or a command associated with the first memory area is communicated on the communications bus; and after execution of the second context command of the first set and before execution of a second context command of the second set, execute on the communications bus at least one of:

a first context command of a third set of the plurality of context commands; or a context command associated with a second area of the plurality of memory areas, the second memory area being different than the first memory area.

2. The storage system of claim 1, wherein the controller is further configured to:

determine an opportunity time period between execution of the second context command of the first set and execution of the second context command of the second set; and during the opportunity time period, execute at least one of the first context command of the third set or the context command associated with the second area.

3. The storage system of claim 2, wherein the controller is further configured to:

execute the second context command of the second set upon expiration of a predetermined time period, the predetermined time period starting upon execution of the first context command of the second set, wherein the opportunity time period occurs before expiration of the predetermined time period.

4. The storage system of claim 2, wherein the opportunity time period extends to a cache busy time period occurring before execution of the second context command of the second set.

5. The storage system of claim 2, wherein the controller is further configured to:

determine a grace period following the opportunity time period;

during the grace period, execute at least one of the first context command of the third set or the context command associated with the second area; and delay execution of the second context command of the second set until execution of the at least one of the first command of the third set or the context command associated with second area during the grace period.

6. The storage system of claim 1, wherein the one or more host commands comprises one or more host read commands, wherein the first context command of the first set, the first context command of the second set, and the first context command of the third set each comprise a sense command, and wherein the second context command of the first set and the second context command of the second set each comprise a data transfer command.

7. The storage system of claim 6, wherein the sense command of the third set comprises a dummy sense command, and wherein the controller is further configured to not execute a data transfer command associated with the dummy sense command.

8. The storage system of claim 7, wherein the controller is further configured to:

determine to execute a sense command of a fourth set of the plurality of sets of context commands before execution of the second sense command of the second set;

replace the dummy sense command with the sense command of the fourth set;

execute the first sense command of the fourth set on the communications bus; and execute a data transfer command of the fourth set after execution of the data transfer command of the second set.

9. The storage system of claim 7, wherein the controller is further configured to:

identify a new host command;

determine that the new host command comprises a host command other than a host read command; and determine not to replace the dummy sense command with a new sense command associated with the new host command.

10. The storage system of claim 1, wherein the one or more host commands comprises one or more host write commands, wherein the first context command of the first set, the first context command of the second set, and the first context command of the third set each comprise a pair of a data transfer command and a program command, and wherein the second context command of the first set and the second context command of the second set each comprise a status command.

11. A method of executing a plurality of sets of context commands on a communications bus linking a non-volatile memory and a controller, the method comprising:

receiving, with the controller, one or more host commands from a host;

in response to receiving the one or more host commands, executing, with the controller, a first context command of a first set of a plurality of sets of context commands on the communications bus, the plurality of context commands being executed for communication of data on the communications bus between the controller and a first memory area of a plurality of memory areas of the non-volatile memory, wherein each of the plurality of memory areas is a different one of a plurality of memory dies;

before executing a second context command of the first set, executing, with the controller, a first context command of a second set of the plurality of sets of context commands on the communications bus;

executing, with the controller, the second context command of the first set after executing the first context command of the second set, wherein executing the first context command of the second set and executing the second context command of the first set causes an internal memory operation to be performed on the first memory area while data or a command associated with the first memory area is communicated on the communications bus; and after executing the second context command of the first set and before executing the second context command of the second set, executing on the communications bus, with the controller, at least one of:

a first context command of a third set of the plurality of context commands;

or a context command associated with a second area of the plurality of memory areas, the second memory area being different than the first memory area.

12. The method of claim 11, further comprising:

determining, with the controller, an opportunity time period that occurs between executing the second context command of the first set and executing the second context command of the second set; and during the opportunity time period, executing, with the controller, at least one of the first context command of the third set or the context command associated with the second area.

13. The method of claim 12, further comprising:
   determining, with the controller, expiration of a predetermined time period that started upon execution of the first context command of the second set; and
   executing, with the controller, the second context command of the second set in response determining the expiration of the predetermined time period,
   wherein the opportunity time period occurs before expiration of the predetermined time period.

14. The method of claim 12, wherein the opportunity time period extends to a cache busy time period occurring before execution of the second context command of the second set.

15. The method of claim 12, further comprising:
   determining, with the controller, a grace period following the opportunity time period;
   during the grace period, executing, with the controller, at least one of the first context command of the third set or the context command associated with the second area; and
   delaying, with the controller, execution of the second context command of the second set until executing the at least one of the first command of the third set or the context command associated with second area during the grace period.

16. The method of claim 11, wherein the one or more host commands comprises one or more host read commands,
   wherein the first context command of the first set, the first context command of the second set, and the first context command of the third set each comprise a sense command, and
   wherein the second context command of the first set and the second context command of the second set each comprise a data transfer command.

17. The method of claim 16, wherein the sense command of the third set comprises a dummy sense command, the method further comprising:
   determining, with the controller, not to execute a data transfer command associated with the dummy sense command.

18. The method of claim 11, wherein the one or more host commands comprises one or more host write commands,
   wherein the first context command of the first set, the first context command of the second set, and the first context command of the third set each comprise a pair of a data transfer command and a program command, and
   wherein the second context command of the first set and the second context command of the second set each comprise a status command.

19. A storage system comprising:
   a non-volatile memory comprising a plurality of memory areas, each of the plurality of memory areas being a different one of a plurality of memory dies; and
   a controller in communication with the non-volatile memory via a communications bus, the controller configured to:
   receive one or more host commands from a host; and
   in response to receipt of the one or more host commands:
      generate a plurality of sets of context commands associated with a first memory area of the plurality of memory areas, the plurality of sets generated for communication of data associated with the one or more host commands on the communications bus; and
      execute the plurality of sets of context commands on the communications bus in accordance with a cache sequence,
      wherein, to execute the plurality of sets of context commands in accordance with the cache sequence, the controller is configured to:
         execute a first context command of a first set of the plurality of sets of context commands;
         execute a first context command of a second set of the plurality of sets of context commands before execution of a second context command of the first set;
         execute the second context command of the first set, wherein execution of the first context command of the second set and execution of the second context command of the first set causes an internal memory operation to be performed on the first memory area while data or a command associated with the first memory area is communicated on the communications bus;
         determine an opportunity time period occurring after execution of the second context command of the first set and before execution of a second context command of the second set; and
         during the opportunity time period, execute a context command on the communications bus that is not part of the first set or the second set.

* * * * *